(12) United States Patent
Zahirovic et al.

(10) Patent No.: US 10,835,884 B2
(45) Date of Patent: Nov. 17, 2020

(54) PARTICLE RETAINING EQUIPMENT

(71) Applicant: HALDOR TOPSØE A/S, Kgs. Lyngby (DK)

(72) Inventors: Emir Zahirovic, Copenhagen NV (DK); Daniel Morton, Pearland, TX (US); Marc Rogato, Houston, TX (US); Flemming Plougstrup Nielsen, Gadstrup (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 16/647,597

(22) PCT Filed: Oct. 19, 2018

(86) PCT No.: PCT/EP2018/078687
§ 371 (c)(1),
(2) Date: Mar. 16, 2020

(87) PCT Pub. No.: WO2019/086271
PCT Pub. Date: May 9, 2019

(65) Prior Publication Data
US 2020/0261874 A1    Aug. 20, 2020

Related U.S. Application Data

(60) Provisional application No. 62/580,080, filed on Nov. 1, 2017.

(51) Int. Cl.
*B01J 4/00* (2006.01)
*B01J 8/00* (2006.01)
(Continued)

(52) U.S. Cl.
CPC ............... *B01J 8/007* (2013.01); *B01J 8/006* (2013.01); *B01J 2208/00769* (2013.01)

(58) Field of Classification Search
CPC ..... B01J 4/00; B01J 4/001; B01J 4/002; B01J 4/005; B01J 8/006; B01J 8/0065;
(Continued)

(56) References Cited

U.S. PATENT DOCUMENTS

2017/0128901 A1    5/2017  Maas et al.

FOREIGN PATENT DOCUMENTS

| WO | 2015136066 A1 | 9/2015 | |
|---|---|---|---|
| WO | 2016102342 A1 | 6/2016 | |
| WO | WO-2016102270 A1 * | 6/2016 | ............ B01J 8/0278 |

OTHER PUBLICATIONS

International Search Report (PCT/ISA/210) dated Nov. 11, 2019, by the European Patent Office as the International Searching Authority for International Application No. PCT/EP2018/078687.
(Continued)

*Primary Examiner* — Natasha E Young
(74) *Attorney, Agent, or Firm* — Buchanan Ingersoll & Rooney P.C.

(57) ABSTRACT

A means for retaining particulate matter, for use in process equipment operated with a fluid, including: a particle retention chamber, a means of suspension, a means of fastening, a support, wherein the particle retention chamber is configured to be suspended from the support by the means of suspension; the means of fastening is configured to fasten the means of suspension to the support.

12 Claims, 13 Drawing Sheets

(51) Int. Cl.
*B01J 8/02* (2006.01)
*B01J 8/04* (2006.01)

(58) Field of Classification Search
CPC . B01J 8/007; B01J 8/008; B01J 8/0085; B01J 8/02; B01J 8/0278; B01J 8/04; B01J 8/0492; B01J 2208/00; B01J 2208/00473; B01J 2208/00769; B01J 2208/00796; B01J 2208/00893; B01J 2208/00902; B01J 2219/00; B01J 2219/00049; B01J 2219/00245; B01J 2219/00247
See application file for complete search history.

(56) References Cited

OTHER PUBLICATIONS

Written Opinion (PCT/ISA/237) dated Nov. 11, 2019, by the European Patent Office as the International Searching Authority for International Application No. PCT/EP2018/078687.

\* cited by examiner

Fig.13
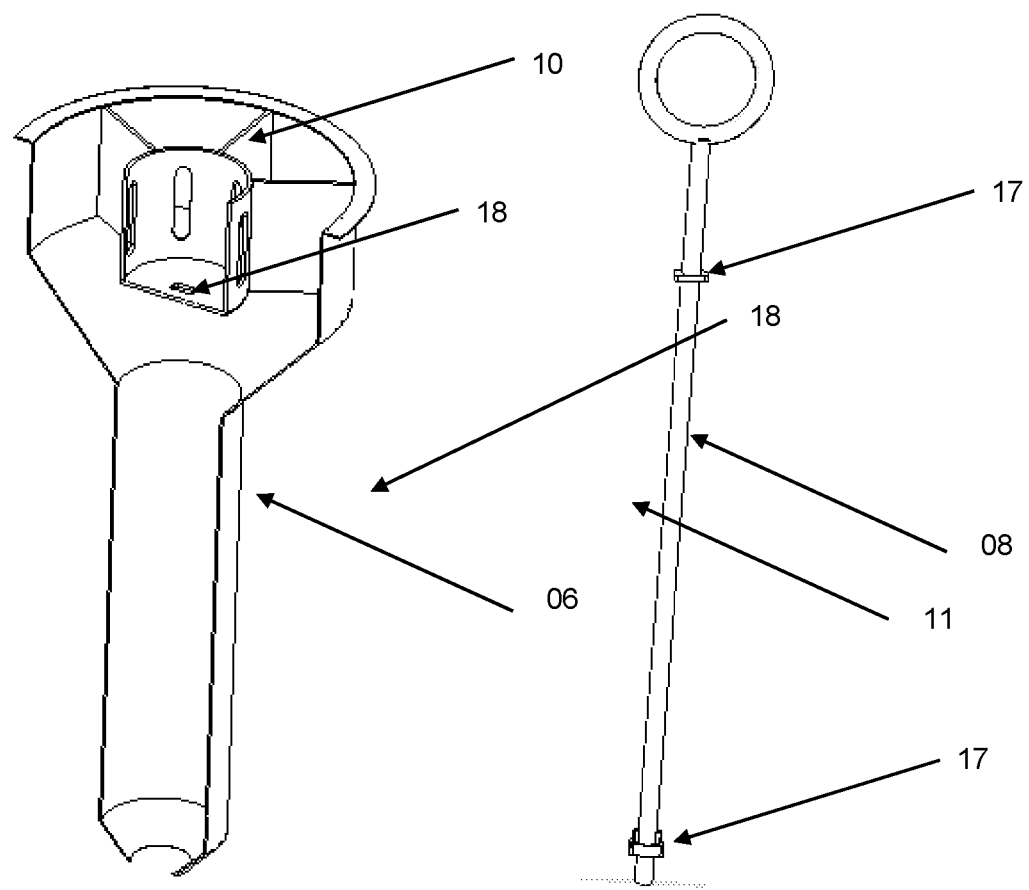
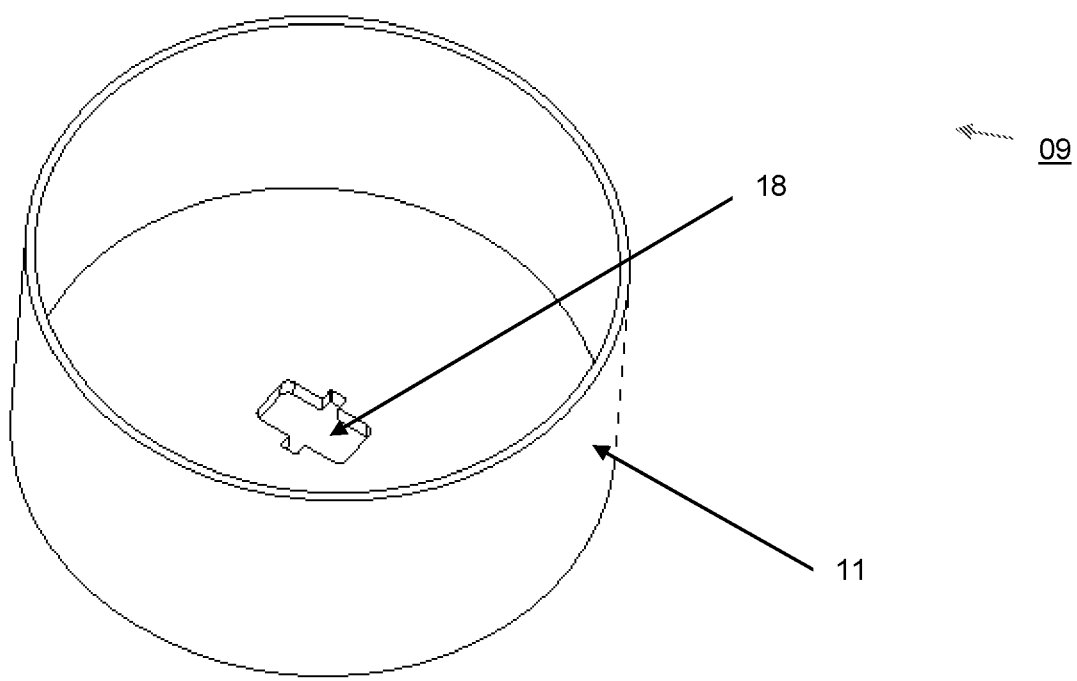

PARTICLE RETAINING EQUIPMENT

This application is a national stage application claiming priority to PCT/EP2018/078687, now WO 2019/086271, filed on Oct. 19, 2018.

FIELD OF THE INVENTION

This invention relates to a process equipment with particle separation. More specifically the invention relates to process equipment which does not comprise means for supporting equipment below the inlet diffuser. The process equipment can be a down-flow catalytic reactor which includes vertically superimposed packed beds of particulate catalytic material. This type of reactor is used in the petroleum and chemical processing industries for carrying out various catalytic reactions, such as sulphur and nitrogen conversion (hydrodesulphurization and hydrodenitrification—HDS/HDN); hydrogenation of: olefins (HYD) and aromatics (hydrodearomatisation—HDA), metals removal (hydrodemetallisation—HDM), oxygen conversion (hydrodeoxygenation—HDO) and hydrocracking (HC). The reactor is a radial converter, where elements of the decks have to be fixed to the reactor. This reactor has a radial flow crossing a packed bed of catalytic material and it is typically used in the petroleum and chemical processing industries for carrying out catalytic reactions such catalytic reforming and ammonia synthesis.

BACKGROUND OF THE INVENTION

Particle separation and classification are well explored need of the chemical, pharmaceutical, mineral and food industries. While particle classification in industrial processes may be required to improve the quality of a certain product, particle separation may be necessary to purify a fluid stream or to avoid problems to process equipment.

Sometimes particles are intentionally present in the process stream. This is for example the case of combustion processes based on pulverised fuels or production of pharmaceutical or specialty chemicals using powder technology. In other cases the presence of particles is unintentional. This is for example the case of some refineries streams, effluents from fluidized beds, product streams from Fischer Tröpsch reactors, and others. Particles may have various origins: they may be part of the original feedstock and other reactant streams or they may be generated in and collected from process equipment, for example as erosion products. Particles may be solid or liquid, may have organic nature, like char, coke and gums, or inorganic nature, like salts, debris or corrosion and erosion as iron components, or debris of catalyst particles. They may be liquid, as some aqueous mists, and containing living impurities as bacteria. Shape and size may also vary greatly—from sphere to flakes, from millimetres to a few microns or less. If the particles are unwanted in the downstream process, often a filter, or other suitable particle separation technology known in the art, removes large part of these particles prior to sensitive equipment. However, in certain processes, the problem may appear or become more severe over time, for example when erosion and corrosion are involved. Sometimes, installing a particle removing equipment as an independent unit operation prior to sensitive equipment is not possible in practice.

One specific example of problems generated by particles may be seen in naphtha hydrotreating. The feed to a hydrotreating reactor is sometimes laden with particles. When the particle-laden feed is introduced into the hydrotreating reactor, the particles tend to accumulate rapidly on the grading or the catalyst, filling the void between grading and catalyst particles. This create obstruction to the passage of the process fluids and therefore increases the pressure drop across the reactor bed. Reactors may thus require frequent removal (skimming) of the layers of the bed affected by particulate deposition, to contain the pressure drop build-up in the reactor. A frequency of once every 5-6 months or even of once every 2-3 months for skimming is not uncommon. Kerosene hydrotreating is another example. While kerosene is mostly processed at temperature below dew-point, and it is therefore in liquid state, when at start of run, as the catalyst deactivates and the temperature of the reactor gradually increases above the dewpoint, kerosene is processed as a mixture of gas and liquid or solely as a gas towards the end of run.

A characterization of the particles affecting a naphtha hydrotreater is seldom available. In fact, the particles depend upon the naphtha feedstock or process related issues (rust, salts, gums, etc.). On-stream collection of the particles is typically not available. Thus, particle characterization relies on analyses of particles sampled after the reactor is shut down. Such analyses are affected by large uncertainties due to particle agglomeration and oxidation.

Similarly, process gas resulting from the regeneration of FCC (fluid catalytic cracking) catalyst is often laden with catalyst particles and catalyst debris. Such gas may be conveyed to a sulphur recovery unit, most commonly a Claus plant, for the recovery as elemental sulphur, or a WSA plant, for the recovery of sulphur as concentrated sulphuric acid. These are catalytic fixed bed reactors which are prone to plugging if exposed to a particle-laden feedstock. The particles commonly present at the exit of the FCC regenerator is generally in the 2-20 micron size range or below.

The need for a retaining particulate matter may appear after the reactor has been fabricated. Not all reactors may be easily retrofitted after fabrication with conventional means to support equipment inside a reactor, such conventional means being, for example, support rings or support brackets. Besides technical drawbacks to welding inside a reactor, such an operation may cause procedural difficulties due to safety considerations. Although technical and procedural difficulties may sometimes be overcome, often the cost and time expenditure required by the process call for different solutions. Thus, the industry has a frequent need of a device and a method ensuring that new equipment may be installed in a reactor even in the absence of a pre-existing support means.

For the purpose of the present application the expressions "particle", "particulate" and similar shall be understood as synonyms. These are impurities present in a process fluid that tend to accumulate on a graded bed, increase restriction to the passage of the fluid, thereby increasing the pressure drop across the bed.

For the purpose of the present application, the expressions "separation", "retention", "removal" and similar shall be understood as synonyms.

For the purpose of the present application the expressions "reactor walls" shall be understood as the portion of the inner surface of a reactor, upon which welding may not be conveniently applied, due to considerations of technical feasibility, safety, economy or other.

For the purpose of the present application a particulate retaining equipment shall be understood as an equipment which achieves the total or partial removal of solid particulate from a liquid stream or the removal of liquid particulate from a gaseous stream, by any means known in the art.

These comprise, but are not limited to, settling, sedimentation, filtration, impaction, momentum breaking and others.

For the purpose of the present application a support for a particulate retaining equipment shall be understood as an element of a reactor, distinct from the reactor wall, which bears the weight of the particulate retaining equipment. For example, such element may be a flange, or part of such flange, of a reactor manway, as accessible, for example, when the flange is opened during maintenance operations.

For the purpose of the present application a means of anchoring of a particulate retaining equipment shall be understood as a mechanical means that cooperate with the support to bear the particulate retaining equipment.

For the purpose of the present application a means of suspension of a particulate retaining equipment shall be understood as a mechanical means that cooperate both with the means of anchoring and with the particle retaining equipment.

For the purpose of the present application a means of fastening shall be understood as a mechanical means that ensures that the particle retaining equipment is fastened to a certain distance from the means of anchoring.

For the purpose of the present application a diffusing pipe shall be understood as a mechanical equipment installed in the inlet manway of the reactor having the purpose to reduce the momentum of the fluid, while letting it in the reactor. A diffusing pipe may also be named an "inlet diffuser".

For the purpose of the present application a particulate retaining equipment comprises a particulate retaining chamber in which the particulate is collected.

For the purpose of the present application the surface of the particulate retaining chamber is defined as "wall" regardless of whether it is horizontal, vertical, straight, bent, or other. If the particulate retaining chamber has a horizontal section, for the purpose of the present application, this may be indicated as floor or as wall.

For the purpose of the present application the wall, or portion of the wall, of the particulate retaining chamber may be permeable to the fluid.

For the purpose of the present application, the aerodynamic diameter is defined, in line with the prevalent definition in physics, as a mathematical function of parameters relating to size, density, and shape, such that, the higher the aerodynamic diameter, the faster a particle settles.

SUMMARY OF THE INVENTION

The present invention describes a novel catalytic chemical reactor comprising a suspended particulate retaining equipment. The equipment displays several features that may be used individually or simultaneously:

1. The particulate retaining equipment does not require a support ring or other support structure welded directly on the reactor wall. Instead the equipment is suspended to an existing support by a simple system comprising a means of anchoring to the support, a means of suspension and a means of fastening. The particulate retaining equipment comprises a particulate retaining chamber. In a simple embodiment, the wall of the particulate retaining chamber is impermeable and particles are collected inside the structure by settling. The particulate retaining equipment comprises a diffusing pipe which has the function to reduce the momentum of the fluid as it enters the reactor, and a deflection rise. This rise ensures that settled particles fall in an area of very low fluid velocity such to minimize the likelihood that settled particles are re-entrained when the fluid leaves the particulate retaining chamber and moves downward towards the catalyst/graded bed. The equipment is typically removed and assembled at each catalyst changeover. The fluid leaves the particulate retaining chamber through an open section at the top, the dimension of which set the pressure drop across the equipment, regardless of whether the particulate accumulation capacity is saturated or not.

2. A further aspect of the invention furthermore describes the method of installation of the particulate retaining equipment. The particulate retaining chamber is installed first, using, for example, the top of the graded bed as installation "platform". The diffusing pipe is lowered down towards the center of the particulate retaining chamber. Cooperation between the two parts is ensured, for example through the means of suspension. The diffusing pipe is anchored on the support by the means of anchoring. Finally, a means of fastening locks the suspended structure in the desired position. Depending upon construction details and the selected embodiment, the means of suspension may be lowered in the reactor together with the first elements of the particulate retaining chamber. Alternatively, the particulate retaining chamber may be built first, and the means of suspensions may be lowered down to the particulate retaining chamber afterwards, and then locked to the particulate retaining chamber through a key-hole mechanism. This latter method has the advantage to maximize accessibility during the installation.

3. As a further aspect of the invention, the wall of the particulate retaining chamber may be permeable to the fluid, but not to the particulate. Various technologies may ensure the correct permeability, for example a vee-wire of the correct mesh, or a grading particles encased in a mesh cage. Enhancing the wall of the particulate retaining chamber with a permeable surface is of particular interest when the fluid fed to the reactor may change state from liquid to gas and vice-versa (for example during start-up and shut down of a naphtha hydroprocessing unit). When the fluid is in liquid state, it would percolate by gravity through the lower part (for example the floor, if the particulate retaining chamber has a flat floor) of the particulate retaining chamber. If the permeable section of the lower part of the particulate retaining chamber is saturated by particulate, the liquid level raises until it meets a portion of the permeable side walls of the particulate retaining chamber that is not saturated. When the fluid is in gas state, it would follow the pre-established pattern of permeating through the permeable wall, as long as the pressure drop is sufficient (permeable wall not yet saturated with particulate). In this condition, the particulate retaining equipment has a dual functionality in particle separation: filtration and settling.

When the permeable wall is saturated with particulate, the fluid flows beyond the wall. When the permeable wall is fully saturated with particulate, the only functionality of the particulate retaining equipment is settling.

POSITION NUMBERS

01. Head of a cylindrical reactor.
02. Particle retaining equipment.
03. Particulate retaining chamber.
04. Wall and floor of particulate retaining chamber.
05. Filtering unit.
06. Diffusing pipe.

07. Support
08. Installation rods.
09. Fastening means.
10. Means of anchoring.
11. Deflection rise.
12. Stabilization element.
13 Reinforcement
14 Mesh of wall element.
15 Filter material of wall element.
16 Reinforcement
17 Key
18 Key-hole

DESCRIPTION OF THE DRAWINGS

FIG. 13 shows an embodiment of a means of fastening (09) comprising one installation rod (08), which passes through the diffusing pipe (06) and comprises a system of keys (17) to be fastened to key-holes (18) passing through the bottom of the particulate retaining chamber, in correspondence of the rise (11) and at a fastening point in the means of anchoring (10).

EXAMPLES

Figure 1:
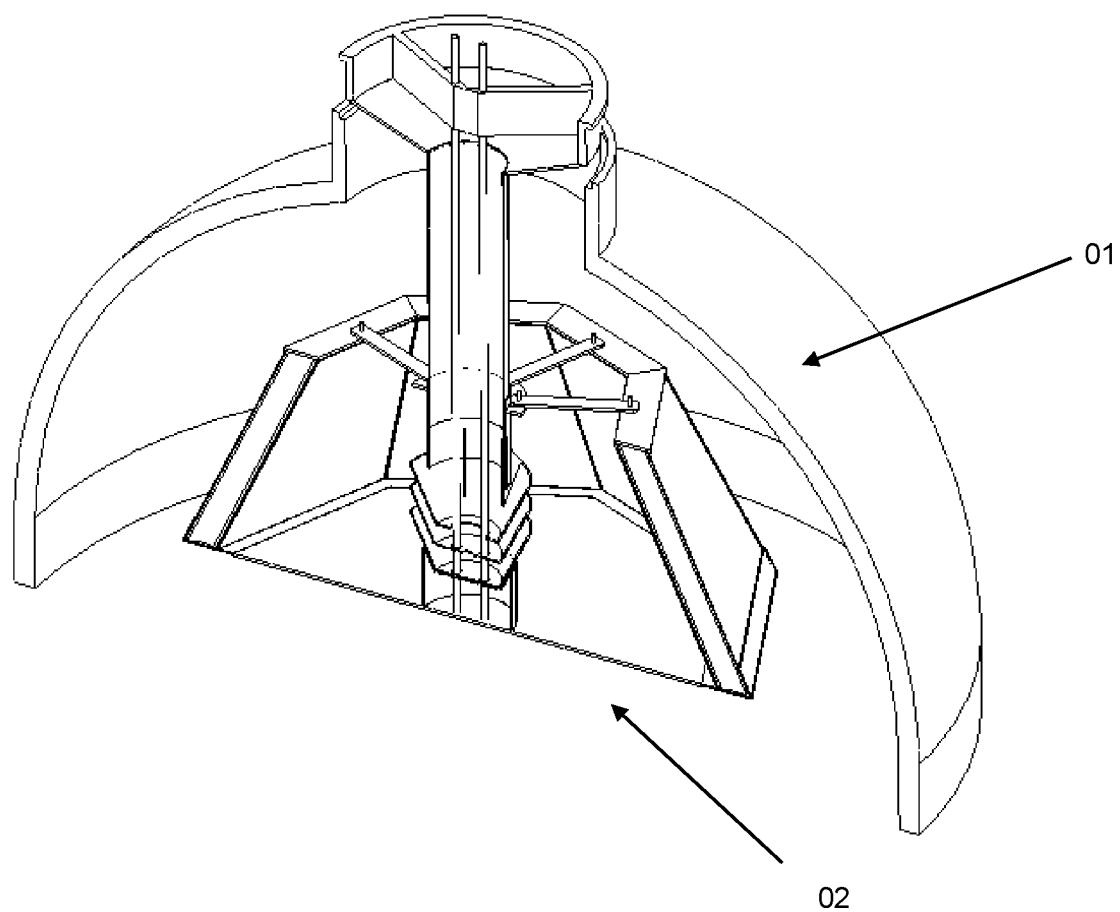
FIG. 1 shows the head (hemispherical) of a cylindrical reactor (01) comprising a particulate retaining equipment (02).
Figure 2:
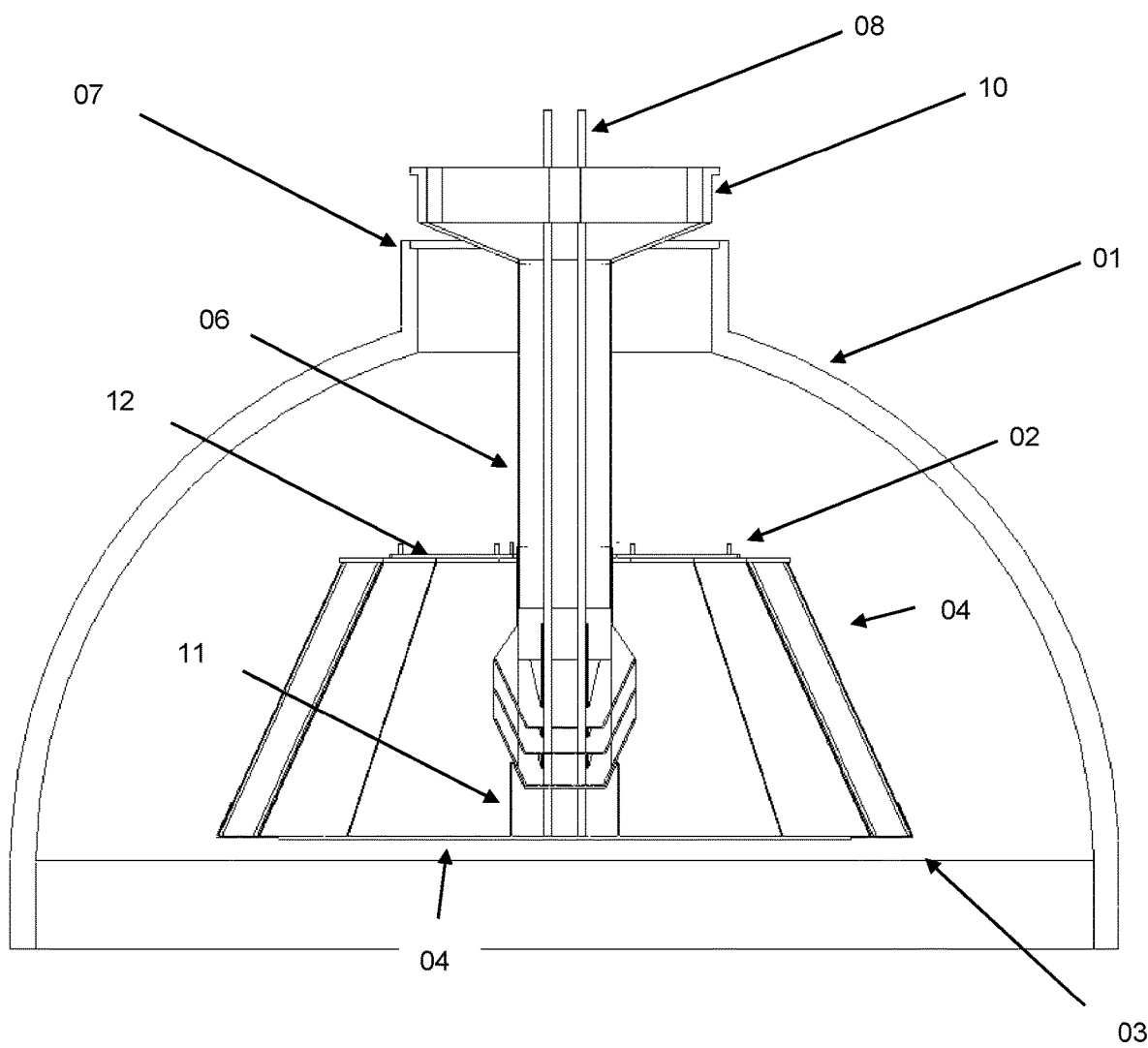
FIG. 2 shows a particulate retaining equipment (02) comprising a particulate retaining chamber (03) which retains the particulate and it is delimited by walls (04) (in this embodiment the particulate retaining chamber has a "bottom wall" corresponding to the floor. In this embodiment the particulate retaining chamber is formed by an octagonal base and by eight panels having the shape of an isosceles trapezoid, each panel connecting with each other and with one side of the octagonal base. The particulate retaining equipment further comprises a diffusing pipe (06); installation rods (08); a means of anchoring (10) which cooperates with the support (07), which in this case is the inlet flange of the reactor (01), a deflection rise (11) which ensures that particulate falls readily in an area in which the fluid has a low velocity, and stabilization elements (12).
Figure 3:
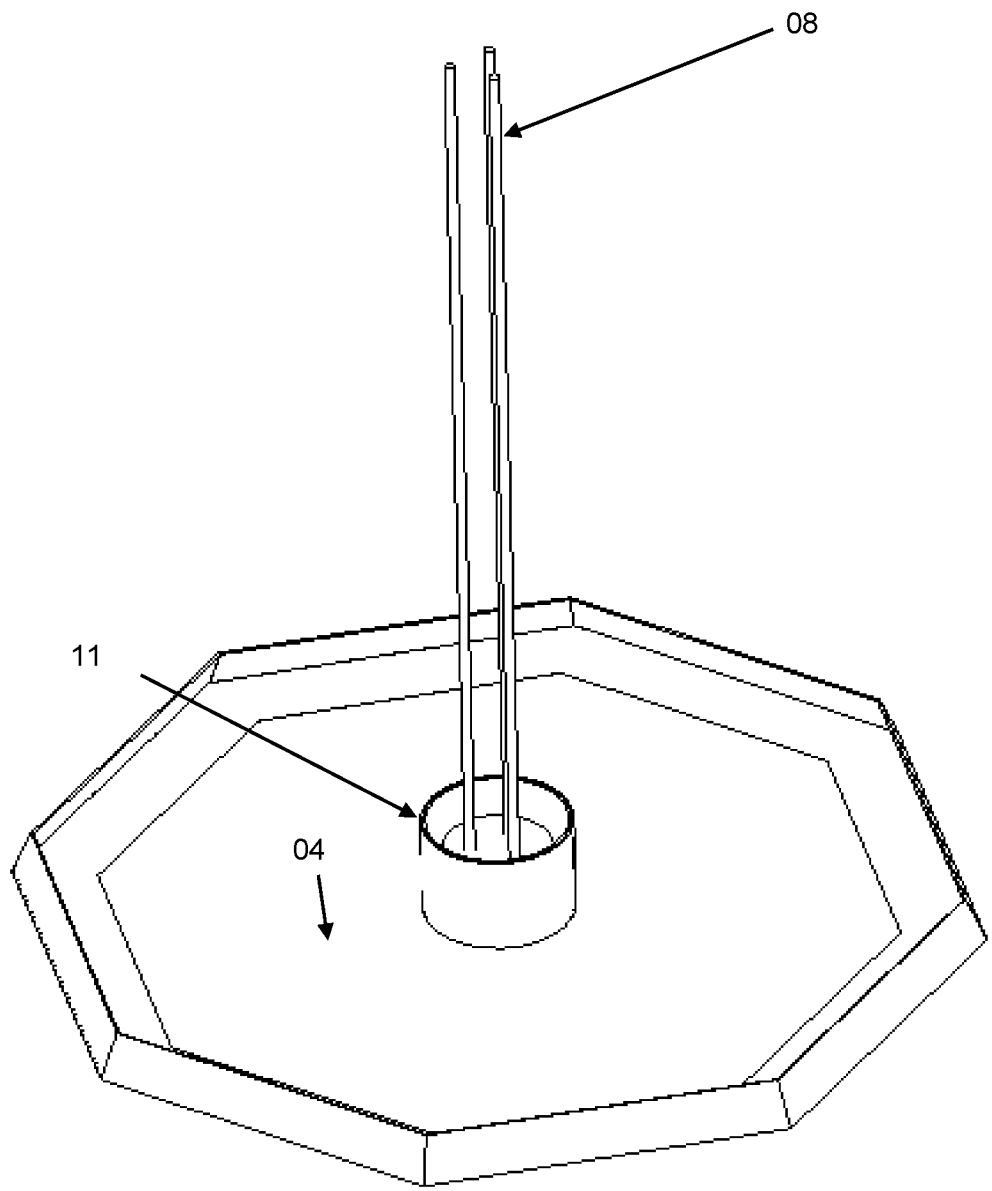
FIG. 3 shows one of the early stages of the construction of the particulate retaining equipment. In this particular embodiment, installation starts with laying a basis wall of the particulate retaining chamber. As this basis "wall" (04) is horizontal it acts as a floor. The floor may be installed placing the parts, for example, on the surface of the catalyst bed or graded bed. The deflection rise (11) and the installation rod (3 in this case) (08) are visible. The installation rod maybe positioned at an early stage or preferably at the end of the installation procedure, such to maximize the accessibility to operators and equipment through the inlet manway.
Figure 4:
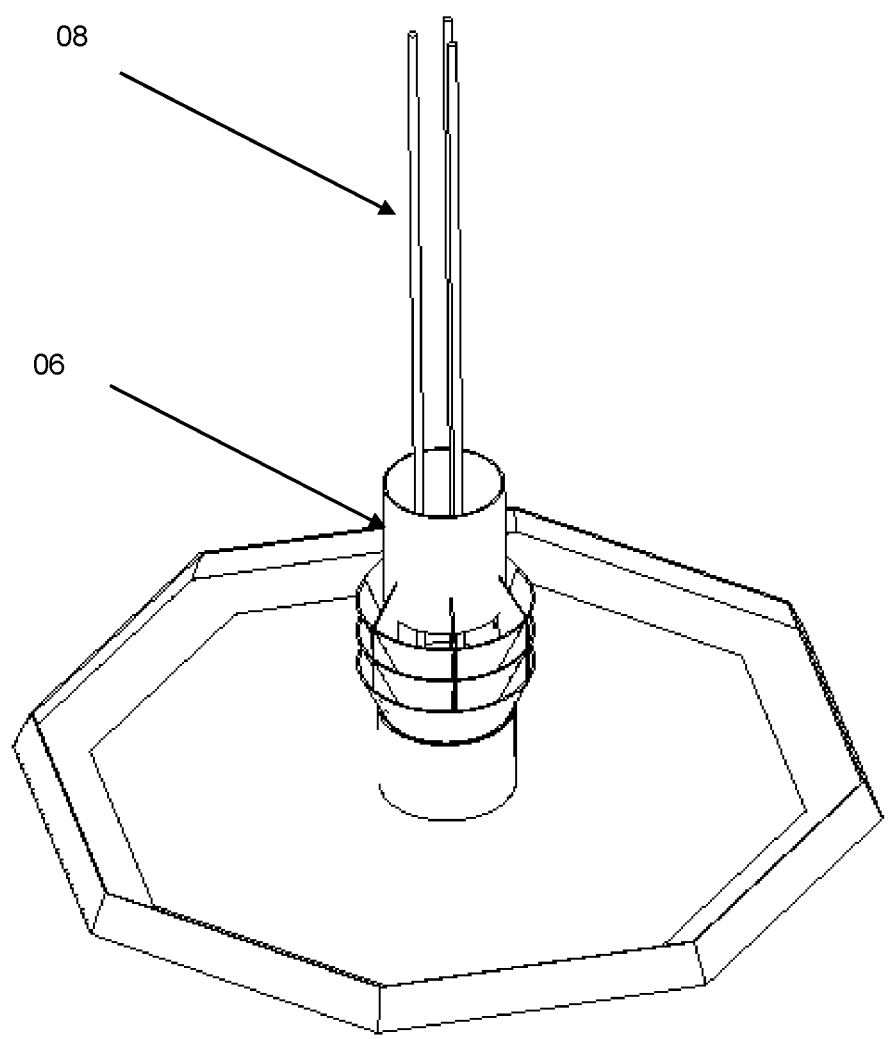
FIG. 4 shows a next step of the installation procedure. At this stage the lower part of the diffusing pipe (06) is slid along the installation rods (08) and lowered down to the deflection rise (11). The diffusing pipe (06) comprises a passage for the installation rod (08) (not shown).
Figure 5:
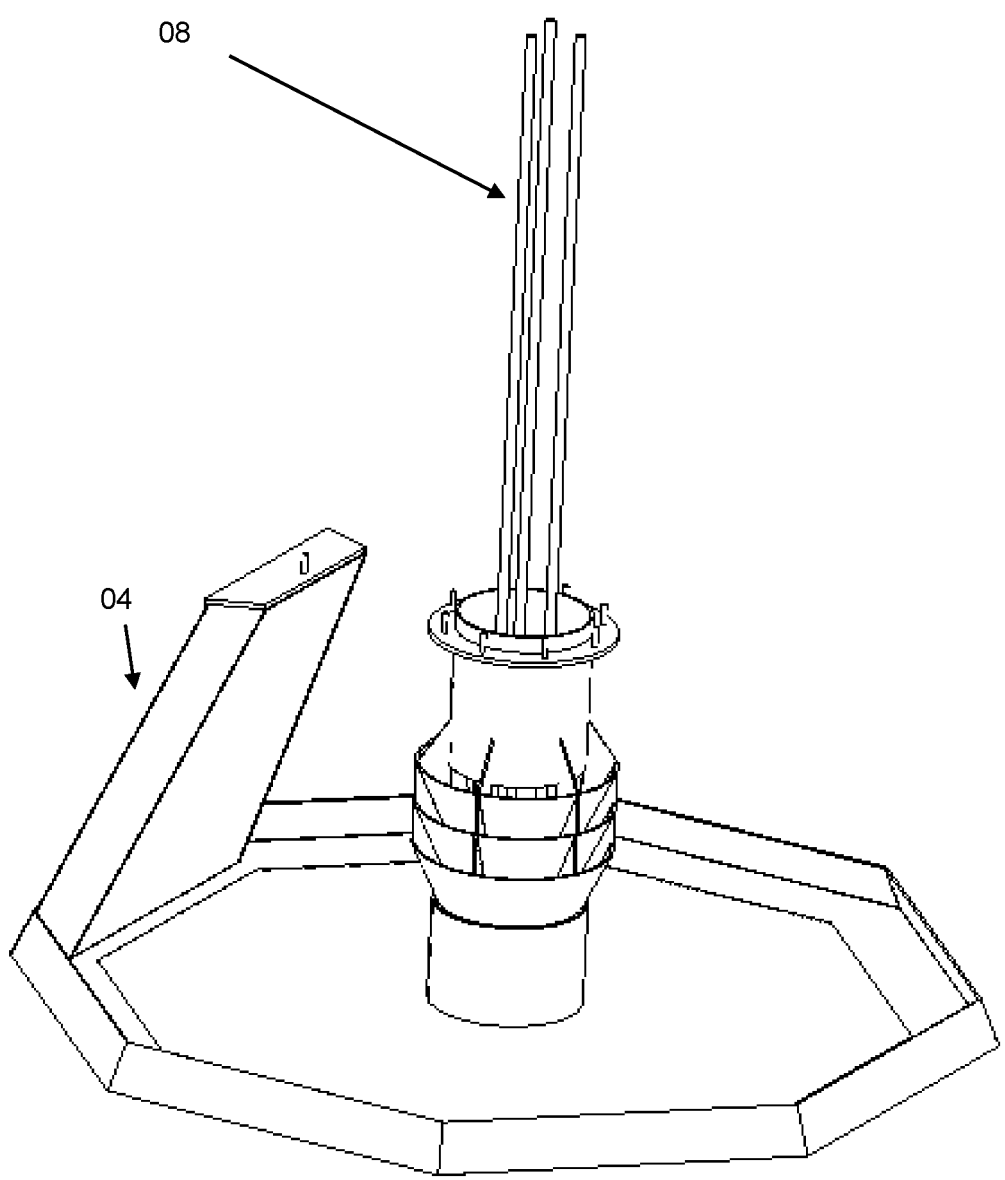
FIG. 5 shows a next step of the installation procedure. At this stage, the lateral wall (04) of the particulate retaining chamber is installed.
Figure 6:
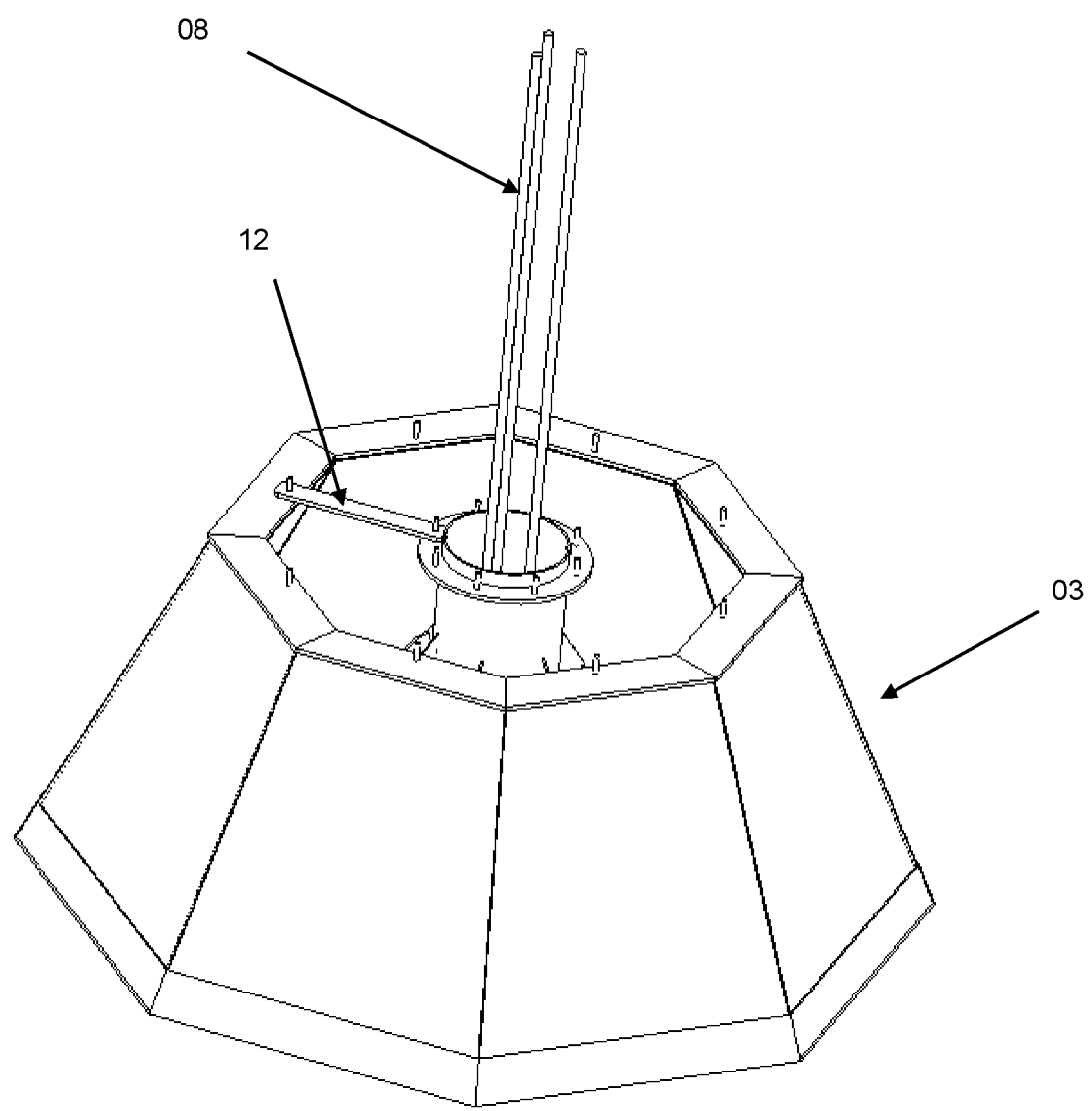
FIG. 6 shows a next step of the installation procedure. At this stage, the particulate retaining chamber (03) is fully installed and a stabilization element (12) is installed too.
Figure 7:
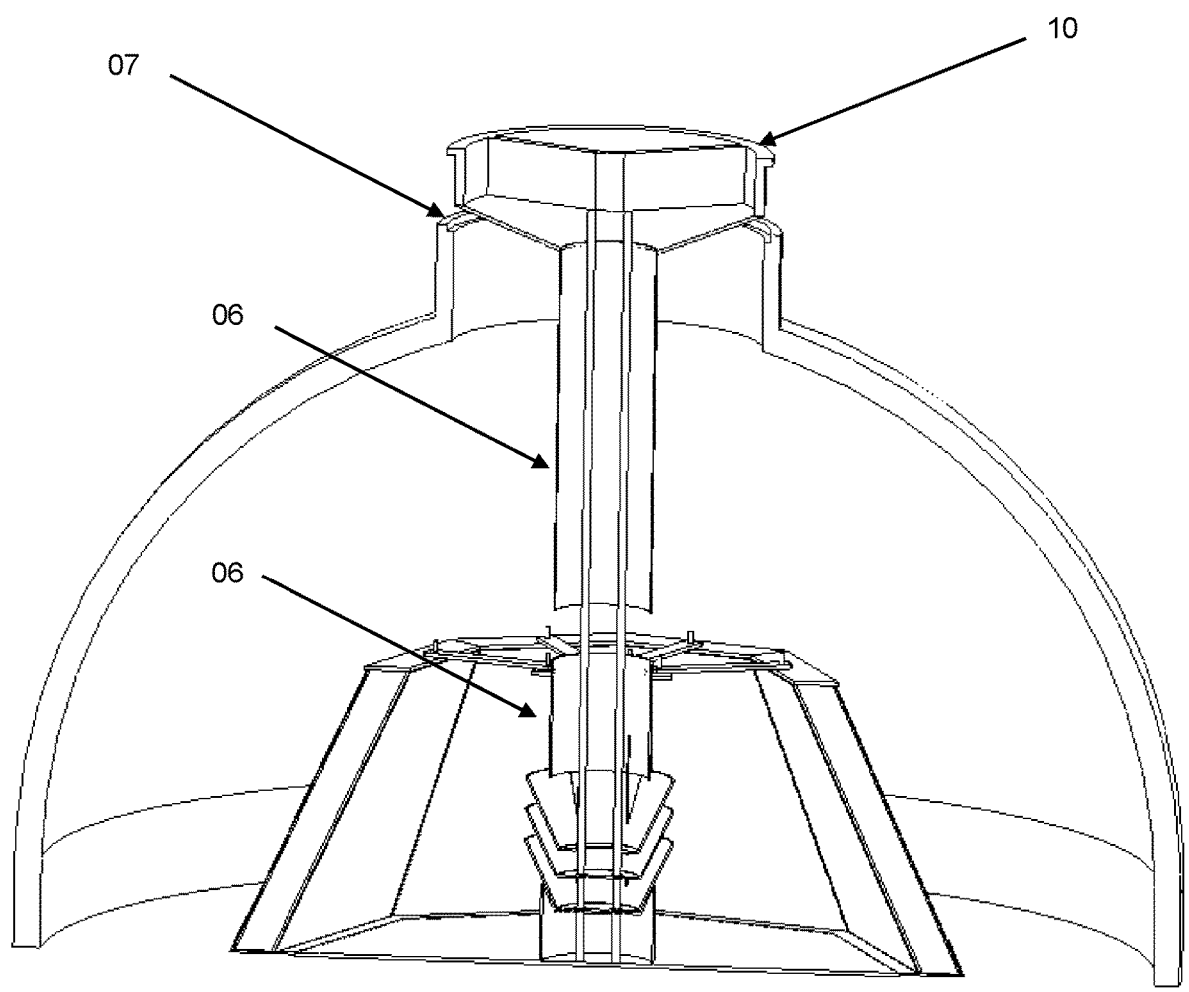
FIG. 7 shows a next step of the installation procedure. At this stage the upper part of the diffusing pipe (06) is slid down, along the installation rods (08). The diffusing pipe (06) comprises a passage for the installation rod (08) throughout (not shown).
Figure 8:
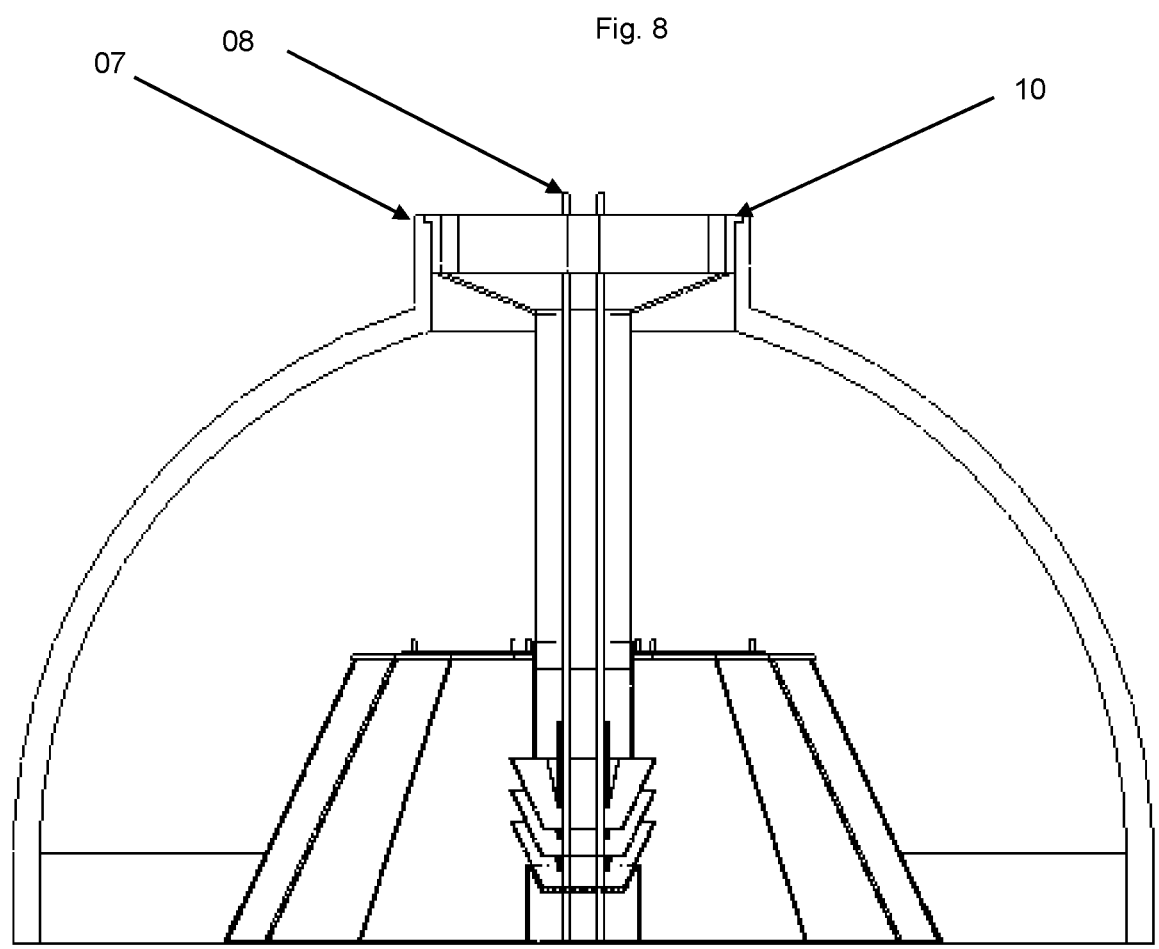
FIG. 8 shows the final position of the upper part of the diffusing pipe, lowered down such to achieve cooperation between the means of anchoring (10) and the support (07). The installation rods (08) protrude above the means of anchoring (10). The installation rods are pulled up such to achieve cooperation between the upper and lower parts of the diffusing pipe and fastened in the correct position (details not shown).
Figure 9:
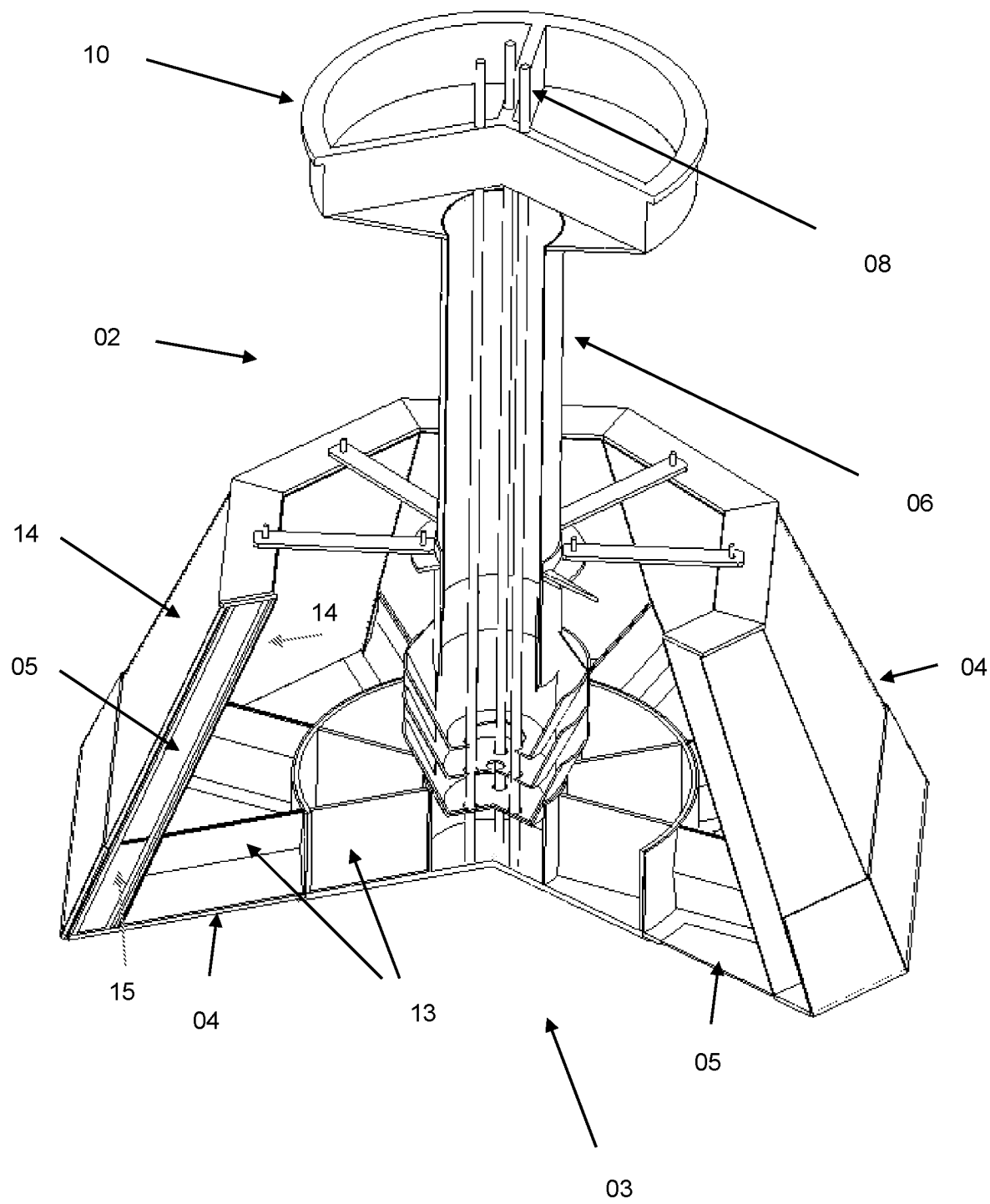
FIG. 9 is a further embodiment comprising permeable walls (05) of the particulate retaining chamber (03). Permeable walls as in this embodiment are obtained by encasing grading material (15) in a meshed structure (14). This embodiment also shows reinforcements (13) on the floor "wall" (04) of the particulate retaining chamber (03) to improve stability.
Figure 10:
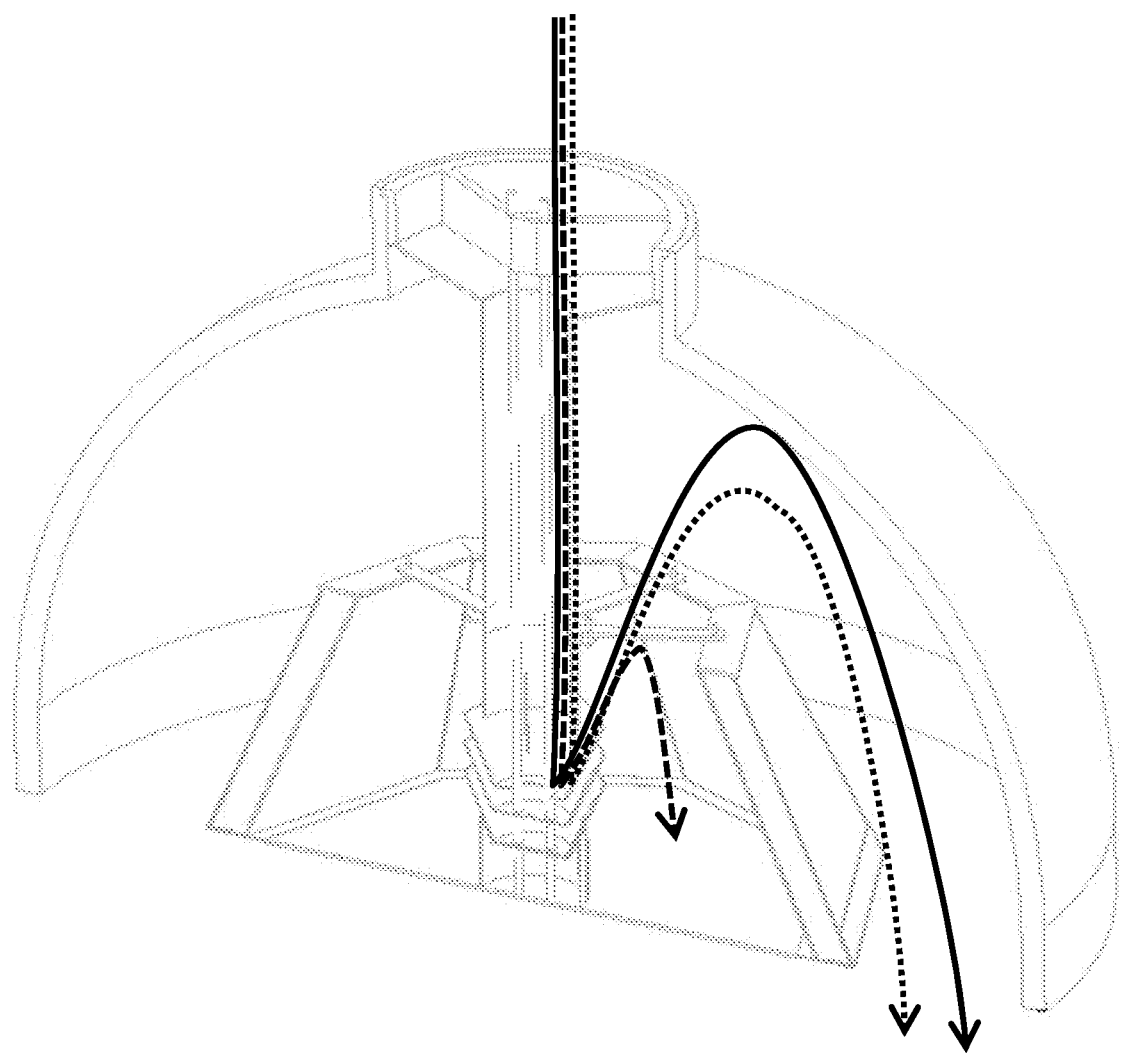
FIG. 10 shows the lines of flow in a particulate retaining equipment separating particles solely by settling. The continuous line represents the line of flow of the fluid, the dotted and dashed lines represent the lines of motion of particulate (dashed particles have a large aerodynamic diameter and settle, dotted particles have a small aerodynamic diameter and continue their path with the fluid).

1) A particulate retaining equipment separating particulate from a fluid by settling operate as shown in FIG. 10. The peripheral wall of the particulate retaining chamber is bent towards the diffusing pipe such to fit in the reactor head. The open section between the upper end of the peripheral wall of the particulate retaining chamber and the diffusing pipe may be a parameter of design to achieve certain flow patterns inside the particulate retaining chamber.

The fluid and the particles flow inside the diffusing pipe. The openings of the diffusing pipes are such to impart to the mixture a motion upwards at the outlet of the diffusing pipe. The motion of the fluid is represented by the continuous line. From the outlet of the diffusing pipe, the fluid continues its motion upwards. Once it has reached the upper end of the wall of the particulate retaining chamber, the fluid exits the particulate retaining equipment. The lines of motion bend downward, and the fluid leaves the head of the reactor underneath the particulate retaining equipment.

The particulate carried by the fluid follows to a certain extent the motion of the fluid at the exit of the diffusing pipe. Particulate of large aerodynamic diameter (dashed line) cannot follow the upwards motion of the gas and fall at the bottom of the particulate retaining chamber. They fall below the deflection rise such that the re-entrainment of the particles by the fluid is less likely. Particulate of small aerodynamic diameter (dotted line) follow the upwards motion of the fluid and exit the particulate retaining system together with the fluid.

Figure 11:
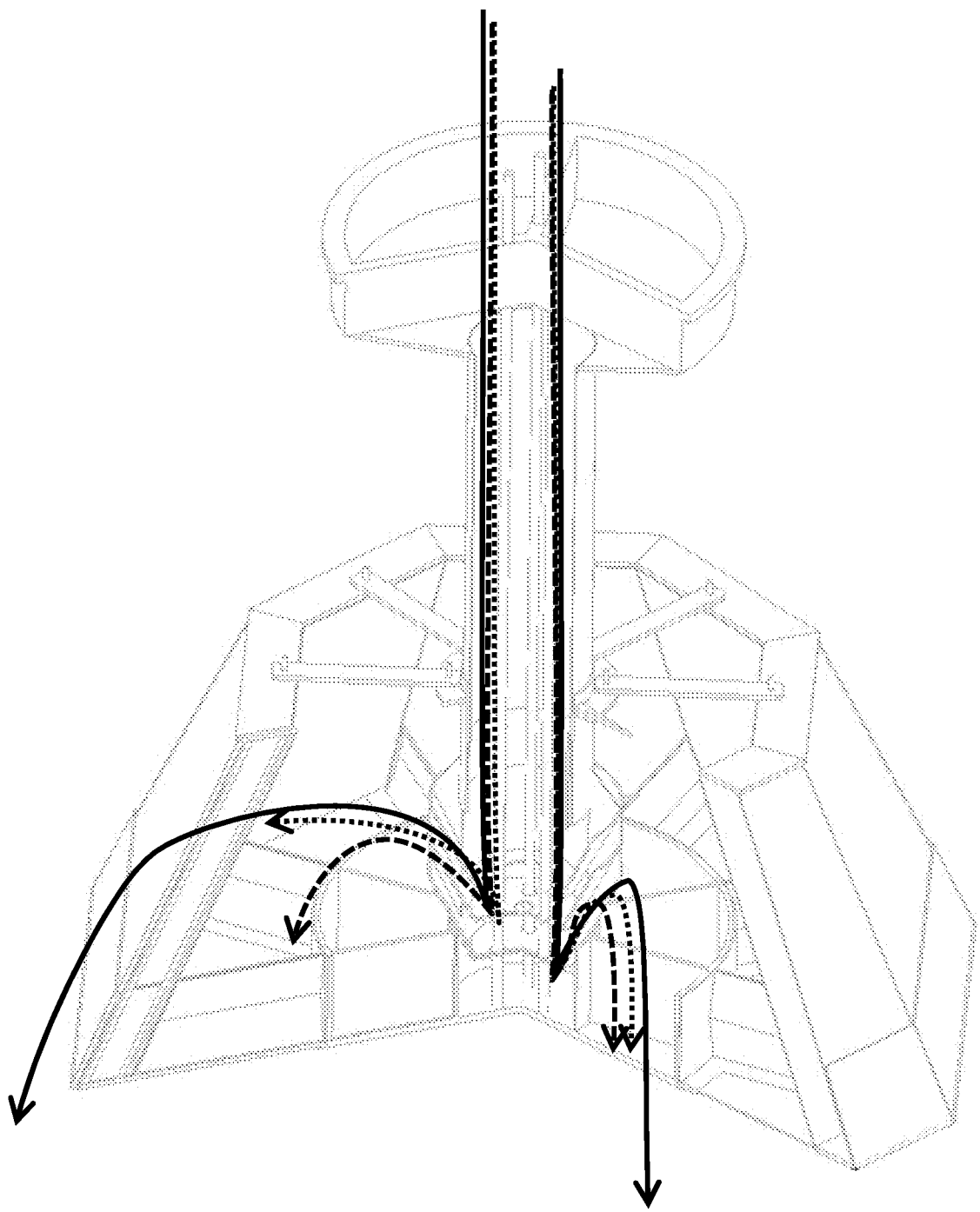
FIG. 11 shows the lines of flow in a particulate retaining equipment separating particles by filtration and settling. The continuous lines represent the line of flow of the fluid (liquid), the dotted and dashed lines represent the lines of motion of particulate. The lines of flow of the right-hand side picture the situation when the filter at the floor is still unsaturated with particulate: liquid goes through, particles stop at the filter. When the floor is saturated with particles, the liquid level raises. The lines of flow are shown at the left-hand side: the liquid permeates though the wall at the portion of the wall that is unsaturated by particles. Particles with a large aerodynamic diameter settle (dashed line), particles with small aerodynamic diameter are retained by the filter.

2) A particulate retaining equipment separating particulate from liquid by filtration operate as shown in FIG. 11. In this example, the geometry of the equipment us similar to that of example 1. However, the whole surface of the particulate retaining chamber is permeable. For example the surface of the particulate retaining chamber may comprise meshed cages enclosing grading or catalyst material.

The right hand side of FIG. 11 shows the motion of liquid flow (continuous line) and of particulate with large (dashed line) and small (dotted line) diameter, when the filters placed at the bottom of the particulate retaining chamber are still non-saturated with particulate. The presence of both gas or liquid or a mixture of the two is not uncommon in a reactor. For example, it can be found in hydroprocessing of naphtha and kerosene. The fluid in liquid state and the particulate flow inside the diffusing pipe. The openings of the diffusing pipes are such to impart to the mixture a motion upwards at the outlet of the diffusing pipe. However, due to the high specific weight of the liquid, initially, when the floor of the particulate retaining chamber is not saturated by particulate, the mixture of liquid and particulate will flow towards the floor. The liquid permeates through the filter, while the particulate is retained (both particulate with large and small diameter).

Figure 12:
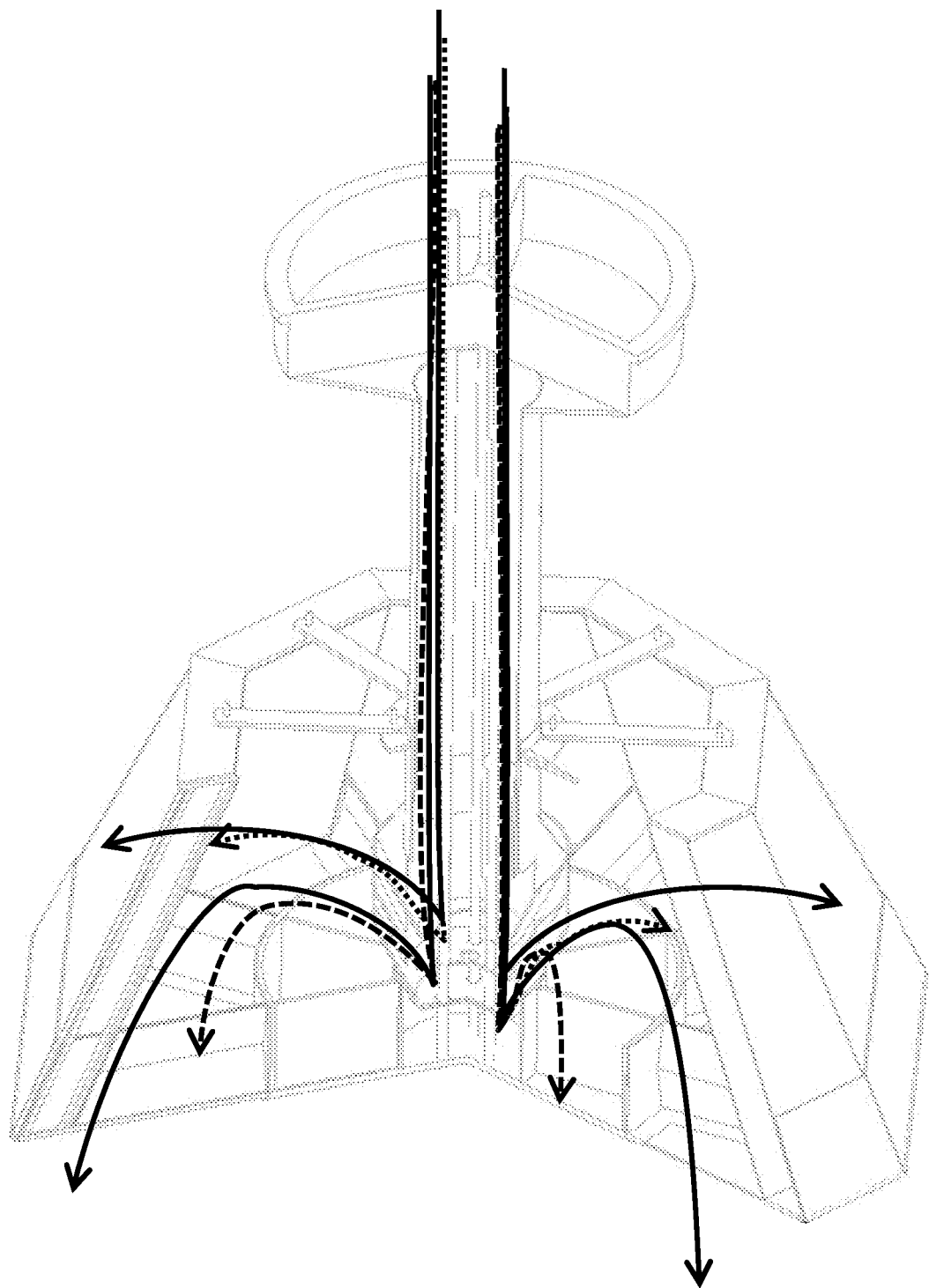
FIG. 12 shows the lines of flow in a particulate retaining equipment separating particles by filtration and settling. The continuous lines represent the line of flow of the fluid (gas in this case), the dotted line represents the lines of motion of particulate. As long as the pressure drop is small, the gas will permeate through the filter more or less in all directions

When the floor becomes saturated with particulate and thus it becomes impermeable to the liquid, the liquid level raises, eventually partially submerging the openings of the diffusing pipe. The level raises as long as the all the lateral wall of the particulate retaining chamber is saturated. Particulate with large aerodynamic diameter (dashed line) settle on the floor. The liquid (continuous line) and the small particulate (dotted line) move towards the peripheral wall of the particulate retaining chamber. The liquid permeates through, while the particulate is retained by the filter 3) A particulate retaining equipment separating particulate from gas by filtration operate as shown in FIG. 12. The particulate retaining equipment of this example 3) is similar to the example 2).

Also in this example, the whole surface of the particulate retaining chamber is made by permeable surface, for example grading material encased in a meshed cage. In order to ensure that gas permeates through the filter, a relatively high pressure needs to be created inside the particulate retaining chamber. This may be achieved reducing the open space between the exit from the particulate retaining chamber and the diffusing pipe. FIG. 12 shows qualitatively that, as long as the walls of the particulate retaining chamber are unsaturated, the gas will spread evenly in all directions from the outlet of the diffusing pipe and permeate through the filters. Particles with large aerodynamic diameter (dashed lines) will fall to the bottom of the particulate retaining chamber; particles with small aerodynamic diameter (dotted lines) travel with the gas towards the wall of the particulate retaining chamber are retained by filtration. While the permeable surface saturates, the pressure drop over the particulate retaining structure increases, part of the gas still exits through the partially saturated filter and part of the gas exits through the top of the particulate retaining chamber. When all the permeable surface of the wall is saturated by particles, the gas exits the particulate retaining chamber from the top and the equipment retains only the large particulate (as in example 1). The pressure drop at this stage is the maximum pressure drop over the equipment and it will not increase further regardless of the quantity of particulate collected in the particulate retaining chamber.

4) A particulate retaining equipment, which is constructed by means of a rod, such rod comprising a key. The key is fastened to the bottom of the particulate retaining chamber (floor), through the deflection rise, after the whole particulate retaining equipment is installed. After the key of the rod has engaged with the particulate retaining chamber, the rod is lifted up, carrying the particulate retaining equipment, and it is fastened to the correct position for example by a second key-lock mechanism 5) A particulate retaining equipment, applied when the fluid is a mixture of gas and liquid. If particulate is carried by the gas phase, the particulate retaining equipment ensures that the gas is bubbled through the liquid phase by opportunely dimensioning the opening of the diffusing pipe. In this way, the particulate carried by the gas is washed by the liquid such to improve the retention efficiency of the equipment.

The invention claimed is:

1. A means for retaining particulate matter, for use in process equipment operated with a fluid, comprising:
 a. a particle retention chamber,
 b. a means of suspension,
 c. a means of fastening,
 d. a support,
 wherein the particle retention chamber is configured to be suspended from the support by the means of suspension; the means of fastening is configured to fasten the means of suspension to the support.

2. The means for retaining particulate matter, according to claim 1, wherein the particle retention chamber comprises a floor and a wall.

3. The particle retention chamber, according to claim 2, wherein the floor comprises a rise and a deflection surface.

4. The particle retention chamber, according to claim 2, wherein at least a portion of said floor is permeable to the fluid.

5. The particle retention chamber, according to claim 2, wherein at least a portion of said wall is permeable to the fluid.

6. The means for retaining particulate matter, according to claim 1, wherein said means of suspension is a means for fluid transport.

7. The means for retaining particulate matter, according to claim 6, wherein the outlet of said means for fluid transport is configured for providing a diffused flow.

8. The means for retaining particulate matter, according to claim 7, wherein at least a part of the outlet of said means for fluid transport is through perforations on the lower part of said means for fluid transport.

9. The means for retaining particulate matter, according to claim 8, wherein said perforations are configured for directing a flow towards a means of flow diversion.

10. The means for retaining particulate matter, according to claim 1, wherein the means of suspension comprises a bar.

11. The means for retaining particulate matter, according to claim 1, wherein the means of suspension comprises a mechanism to cooperate with the means of a fastening.

12. The means for retaining particulate matter, according to claim 1, wherein the means of fastening is a nut bolt and the means of suspension comprises a threaded bar.

* * * * *